(12) United States Patent
Schwab et al.

(10) Patent No.: US 10,323,684 B2
(45) Date of Patent: Jun. 18, 2019

(54) CAGE-LESS BALL ROLLER THRUST BEARING

(71) Applicant: SCHAEFFLER TECHNOLOGIES AG & CO. KG, Herzogenaurach (DE)

(72) Inventors: Charles Schwab, Fort Mill, SC (US); James Brown, Rock Hill, SC (US); Joseph T. Griffin, Mathews, NC (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 0 days.

(21) Appl. No.: 15/805,383

(22) Filed: Nov. 7, 2017

(65) Prior Publication Data
US 2019/0136909 A1     May 9, 2019

(51) Int. Cl.
*F16C 19/10*     (2006.01)

(52) U.S. Cl.
CPC .................. *F16C 19/10* (2013.01)

(58) Field of Classification Search
CPC ............... F16C 19/10; F16C 33/588
USPC .................................. 384/609, 610
See application file for complete search history.

(56) References Cited

U.S. PATENT DOCUMENTS

| | | | | |
|---|---|---|---|---|
| 778,379 | A | * | 12/1904 | Slentz ............... F16C 19/10 384/609 |
| 818,787 | A | * | 4/1906 | Rader et al. ......... F16C 19/10 384/592 |
| 829,085 | A | * | 8/1906 | Perkins .............. F16C 19/10 384/609 |
| 1,080,169 | A | * | 12/1913 | Reed ............... F16C 43/086 29/725 |
| 3,874,028 | A | * | 4/1975 | Ernst ................ E05D 11/04 16/276 |

* cited by examiner

*Primary Examiner* — Phillip A Johnson
(74) *Attorney, Agent, or Firm* — Brooks Kushman P.C.

(57) ABSTRACT

A cage-less thrust bearing includes first and second washers concentrically arranged such that the washers cooperate to define a ball chamber having a first pair of opposing axially extending race surfaces and a second pair of opposing radially extending race surfaces. A plurality of balls are disposed in the ball chamber without being retained by a cage. Each ball is configured to ride on each of the race surfaces.

17 Claims, 2 Drawing Sheets

CAGE-LESS BALL ROLLER THRUST BEARING

TECHNICAL FIELD

The present disclosure relates to roller thrust bearings for transmissions and more specifically to thrust bearings that include cage-less spherical rolling elements.

BACKGROUND

Thrust bearings have been used for absorbing axial-thrust loads between adjacent components while also providing low-friction rotation between the components. Thrust bearings are commonly used in automatic transmissions for axially supporting components of the planetary gear sets. A typical thrust bearing includes opposing first and second race plates, a plurality of cylindrical rolling elements, and a cage for supporting and retaining the rolling elements. A primary purpose of the thrust bearings is to provide axial spacing and many of the thrust bearings within the transmission experience light axial loads.

SUMMARY

According to one embodiment, a cage-less thrust bearing includes first and second washers concentrically arranged such that the washers cooperate to define a ball chamber having a first pair of opposing axially extending race surfaces and a second pair of opposing radially extending race surfaces. A plurality of balls are disposed in the ball chamber without being retained by a cage. Each ball is configured to ride on each of the race surfaces.

According to another embodiment, a cage-less thrust bearing includes a cup washer and a collar washer. The cup washer includes inner and outer axially extending flanges interconnected by a radially extending sidewall that defines a first thrust surface. The flanges and sidewall are arranged to form a C-shaped cross section. The collar washer includes a radially extending sidewall that defines a second thrust surface and an axially extending collar projecting from the sidewall. The cup washer and the collar washer are concentrically arranged to define a ball chamber. A plurality of balls are disposed in the ball chamber. The balls are not retained by a cage so that adjacent ones of the balls are configured to contact each other.

According to yet another embodiment, a cage-less thrust bearing includes first and second washers concentrically arranged such that the washers cooperate to define a ball chamber having a first pair of opposing axially extending race surfaces and a second pair of opposing radially extending race surfaces. A plurality of balls are disposed in the ball chamber without being retained by a cage. Each ball is configured to ride on each of the race surfaces.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A primary purpose of the thrust bearings is to provide axial spacing and many of the thrust bearings within a transmission experience light axial loads. In current designs, many of the thrust bearings within a transmission are oversized, i.e., the load-carrying capacity of the bearings greatly exceed the loads exerted on the bearing. This oversizing causes the physical size of the bearing to be larger than necessary. Reducing the physical size of the thrust bearings enables a smaller overall transmission package, which transmission designers often desire.

Conventional thrust bearings include a cage for retaining the rolling elements. The cage displaces volume between the race plates and increases the overall physical size of the bearing. By eliminating the cage, the physical size of the bearing can be reduced and thus the required packaging space within the transmission for the bearing can also be reduced leading to a smaller overall transmission package.

The following figures and related text describe cage-less thrust bearings that have a smaller physical size than conventional thrust bearings in use today.

Figure 1:
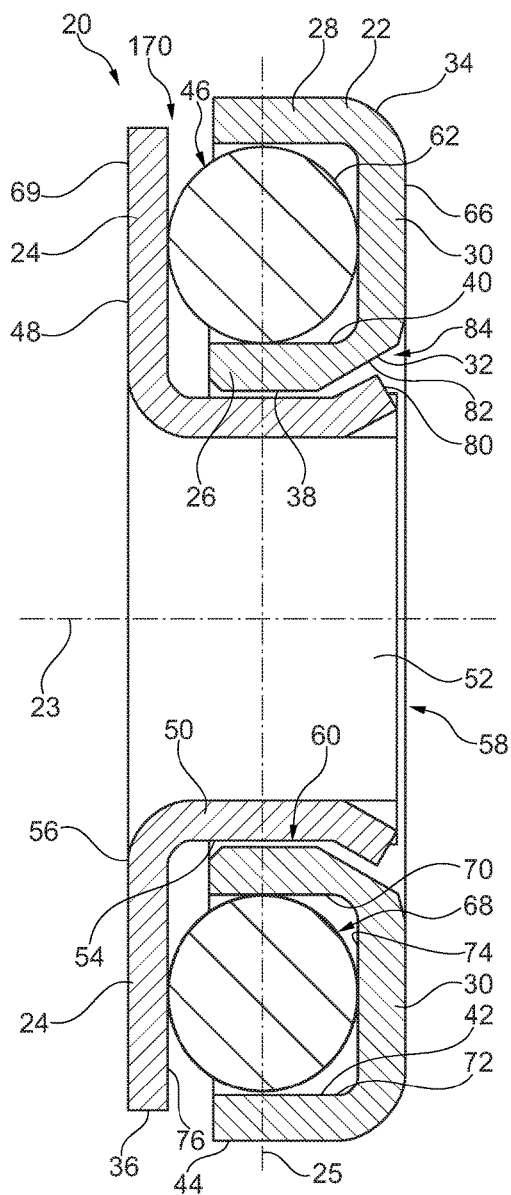
FIG. 1 is a cross-sectional view of a thrust bearing according to one embodiment.

Referring to FIG. 1, a thrust bearing 20 includes a cup washer 22 (sometimes referred to as a race) generally positioned on a right side of the bearing 20 and a collar washer 24 (sometimes referred to as a race) generally positioned on the left side of the bearing 20. A plurality of balls 62 are disposed between the cup washer 22 and the collar washer 24 allowing low-friction rotation of the washers 22, 24 relative to each other. The balls 62 also provide an axial thrust force that resists the cup washer 22 from being pushed towards the collar washer 24 when components exert an axial force on the bearing 20. (The axial direction is shown by line 23, and the radial direction is shown by line 25.)

The cup washer 22 may include an inner flange 26, an outer flange 28, and a sidewall 30 extending between the inner and outer flanges. The flanges 26, 28 extend axially and the sidewall 30 extends radially. The inner flange 26 and the sidewall 30 define an inner corner 32, and the outer flange 28 in the sidewall 30 define an outer corner 34. The flanges and the sidewall may be arranged to form a C-shaped cross section having a channel 46 configured to receive and retain spherical rolling elements 62, which are commonly referred to as balls. The inner flange 26 has an inner diameter 38 and an outer diameter 40. The outer flange 28 has an inner diameter 42 and an outer diameter 44. The flanges 26 and 28 are concentric with each other. The radial spacing between the inner diameter 42 of the outer flange 28 and the outer diameter 40 of the inner flange 26 is slightly larger than the diameter of the balls 62 allowing the balls 62 to freely rotate within the channel 46.

The collar washer 24 may include a sidewall 48 that extends radially and a collar 50 that extends axially. In the illustrated embodiment of FIG. 1, the collar 50 extends from an inner end 56 of the sidewall 48, but in other embodiments, such as that shown in FIG. 3, the collar 50 extends from an outer end of the sidewall 36. The collar 50 has an inner diameter 52 and an outer diameter 54. The inner diameter 52 defines a circular opening 58 for receiving a shaft or hub therethrough.

The cup washer 22 and the collar washer 24 may be concentrically arranged with the inner diameter 38 of the inner flange 26 seated on the outer diameter 54 of the collar 50 at a rotational interface 60. (Note: the figures show an enlarged air gap for illustrative purposes.) The dimensions of the inner diameter 38 and the outer diameter 54 allow the cup washer 22 and the collar washer 24 to rotate relative to each other about the rotational interface 60 without incurring excessive drag. The sidewall 30 of the cup washer 22 defines a thrust surface 66 configured to engage with a component such as a stationary or rotating component of the transmission. The sidewall 48 of the collar washer 24 defines a thrust surface 69 configured to engage with a second component such as a stationary or rotating component of a transmission.

The balls 62 are not retained by a cage or equivalent element as is traditionally done. Instead, the balls 62 are retained by the cooperation of the cup washer 22 and the collar washer 24. Since the bearing 20 is cage-less, adjacent balls 62 are configured to engage each other. The cup washer 22 and the collar washer 24 cooperate to define a ball chamber 68. The ball chamber 68 is bounded axially between the first and second sidewalls 30, 48 and radially between the inner and outer flanges 26, 28. The chamber 68 includes four race surfaces each configured to engage with the balls 62 in order to retain the balls in place as well as allow rotation of the balls 62 so that the cup washer 22 can freely rotate relative to the collar washer 24. For example, the inner flange 26 defines race surface 70, the outer flange 28 defines race surface 72, the sidewall 30 defines race surface 74, and the sidewall 48 defines race surface 76.

The bearing 20 may be assembled by placing a plurality of the balls 62 into the channel 46 of the cup washer 22, and subsequently installing the collar washer 24 over the cup washer 22 by inserting the collar 50 into the inner diameter 38 of the inner flange 26. The collar washer 24 may include a plurality of tabs 80 that engage with the backside of the cup washer 22 to prevent separation of the collar washer 24 and the cup washer 22. In the illustrated embodiment, the washers include a small amount of play allowing the collar washer 24 and the cup washer 22 to axially slide relative to each other, but not enough to allow the balls 62 to escape the chamber 68.

The tabs 80 may be disposed on an end of the collar 50 and project radially outward from the collar to engage with the cup washer 22. The tabs 80 are circumferentially spaced around the collar 50, and the bearing 20 may include three to five tabs depending on the size of the bearing. Of course, this is just an example and the number of tabs may be increased or decreased. The inner corner 32 may include a chamfer 82 to create a void space 84 for receiving the tabs 80.

Figure 2:
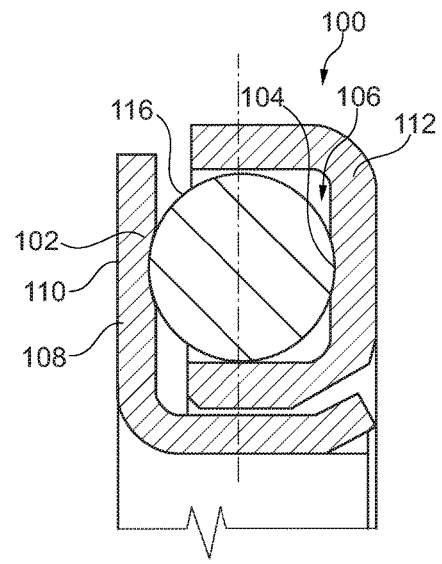
FIG. 2 is a partial cross-sectional view of a thrust bearing having ball grooves.

The load-bearing capacity of the bearing 20 can be increased by including grooves on the cup washer 22 and the collar washer 24. Referring to FIG. 2, a bearing 100 that is similar to bearing 20 except that bearing 100 includes a first groove 102 and a second groove 104 defined in the ball chamber 106. The first groove 102 is defined by the sidewall 108 of the collar washer 110, and the second grooves 104 is defined by the sidewall 112 of the cup washer 114. The grooves 102, 104 are circular and are continuous in the circumferential direction of the sidewalls. These grooves have a radius substantially equal to that of the balls 116 so that a good osculation between the balls 116 and the grooves 102, 104 are obtained in the loaded state.

Figure 3:
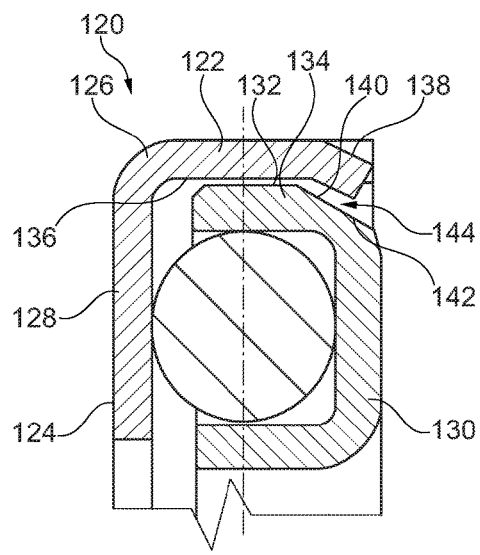
FIG. 3 is a partial cross-sectional view of a thrust bearing according to another embodiment.

FIG. 3 shows a bearing 120 that is similar to bearing 20 except that the collar 122 of the collar washer 124 extends from the outer end 126 of the sidewall 128 rather than the inner end as was shown in FIG. 1. The cup washer 130 is received within the collar washer 124 with the outer diameter 132 of the outer flange 134 seated on the inner diameter 136 of the collar 122. The collar 122 defines a plurality of tabs 138 that project inwardly from the collar 122 to engage with the cup washer. In this embodiment, the outer corner 140 of the cup washer includes the chamfer 142 providing a void space 144 for the tabs 138.

Figure 4:
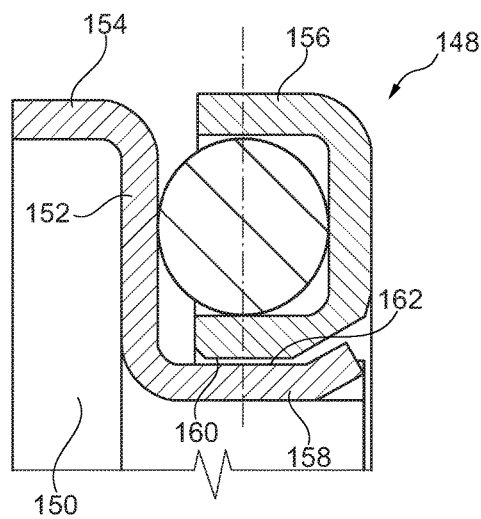
FIG. 4 is a partial cross-sectional view of a thrust bearing having a Z-shaped collar washer.

In the illustrated embodiments of FIGS. 1-3, the collar washer had an L-shaped cross section. The collar washer, however, can have other cross-sectional shapes depending upon the placement of the bearing in the transmission or other component. FIG. 4, for example, illustrates a bearing 148 including a Z-shaped collar washer 150. The collar washer 150 may include a sidewall 152, an outer flange 154 extending axially away from the cup washer 156, and an inner flange 158 extending axially towards the cup washer 156. The cup washer 156 includes an inner diameter 160 that is seated on the outer diameter 162 of the inner flange 158. Alternatively, the outer flange 154 may extend towards the cup washer 156 and the inner flange 158 may extend away from the cup washer 156. Here, the cup washer 156 is received within the outer flange of the collar washer similar to the embodiment illustrated in FIG. 3. It is to be understood that the specific cross-sectional shape of the collar washer is not limited to L-shaped or Z-shaped cross sections, and that the collar washer 150 may have any suitable cross-sectional shape as long as a race surface on the sidewall is maintained.

Figure 5:
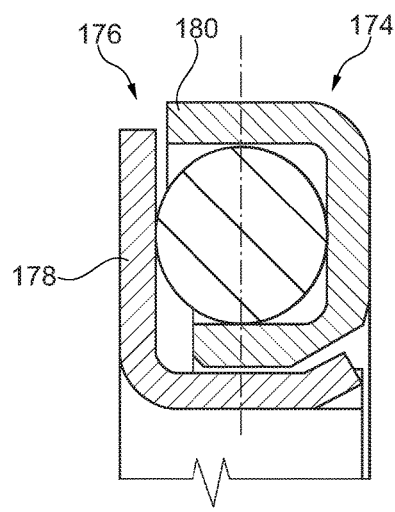
FIG. 5 is a partial cross-sectional view of the thrust bearing having extended portions on the collar and cup washers.

Bearings may be used to regulate the flow of lubricant, such as oil, within the transmission or other component. Depending upon the bearing design, the bearing may freely allow oil through the bearing or impede the flow of oil through the bearing. Referring back to FIG. 1, the cup washer 22 and the collar washer 24 are sized such that a fairly large gap 170 is defined between the sidewall 48 and an end of the outer flange 28. The gap 170 permits oil to flow through the bearing without substantially impeding the flow of oil. In contrast, FIG. 5 illustrates a bearing 174 that has a relatively small gap 176 in order to restrict the flow of oil through the bearing. The gap 176 of the bearing 174 was reduced by extending the sidewall 178 and the outer flange 180.

Figure 6:
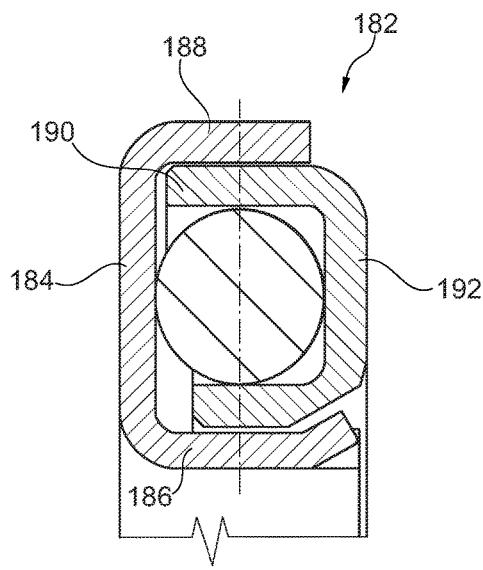
FIG. 6 is a partial cross-sectional view of a thrust bearing according to a further embodiment.

FIG. 6 illustrates another bearing 182 that is even more restrictive than bearing 174. The bearing 182 does not include any gaps; instead, the collar washer 184 includes both an inner collar 186 and an outer collar 188 that overlaps the outer flange 190 of the cup washer 192. While not illustrated in the figures, the bearings could include oil slots formed in one or more portions of the cup washer and the collar washer in order to further control oil flow through the bearing. For example, oil flow may be increased through the bearing by providing oil slots. The amount of flow increase is dependent upon the size and location of the slots.

While example embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated.

What is claimed is:

1. A cage-less thrust bearing comprising:
    a cup washer including inner and outer axially extending flanges interconnected by a radially extending sidewall that defines a first thrust surface, wherein the flanges and sidewall are arranged to form a C-shaped cross section;
    a collar washer including a radially extending sidewall that defines a second thrust surface and an axially extending collar projecting from the sidewall, wherein the cup washer and the collar washer are concentrically arranged to define a ball chamber, and an inner diameter of the inner flange is seated on an outer diameter of the collar; and
    a plurality of balls disposed in the ball chamber, the balls not being retained by a cage so that adjacent ones of the balls are configured to contact each other.

2. The cage-less thrust bearing of claim 1, wherein an outer diameter of the outer flange is seated on an inner diameter of the collar.

3. The cage-less thrust bearing of claim 1, wherein the collar defines at least one tab configured to engage with the cup washer to prevent axial separation of the collar washer and the cup washer.

4. The cage-less thrust bearing of claim 3, wherein the cup washer defines a chamfer extending between the inner flange and the sidewall, and the tab is disposed in a void space created by the chamfer.

5. The cage-less thrust bearing of claim 1, wherein the ball chamber includes four race surfaces and each ball is configured to ride on each of the four race surfaces.

6. A cage-less thrust bearing for a transmission comprising:
    a collar washer including an axially extending inner collar and a radially extending first sidewall that extends radially outward from the inner collar and defines a first thrust surface;
    a cup washer including concentric inner and outer flanges interconnected by a radially extending second sidewall defining a second thrust surface, the cup washer being concentrically arranged with the collar washer such that one of the inner and outer flanges is seated on the collar, wherein the collar washer and the cup washer cooperate to define a ball chamber bounded axially between the first and second sidewalls and radially between the inner and outer flanges; and
    a plurality of balls disposed in the ball chamber with each ball having an associated first race surface defined on the outer flange, an associated second race surface defined on the inner flange, an associated third race surface defined on the first sidewall, and an associated fourth race surface defined on the second sidewall.

7. The cage-less thrust bearing of claim 6, wherein an inner diameter of the inner flange is seated on an outer diameter of the inner collar.

8. The cage-less thrust bearing of claim 6, wherein the axially extending collar is an outer collar and the first sidewall extends radially inward from the outer collar.

9. The cage-less thrust bearing of claim 8, wherein an outer diameter of the outer flange is seated on an inner diameter of the outer collar.

10. The cage-less thrust bearing of claim 6, wherein the axially extending collar defines at least one tab configured to engage with the cup washer to prevent axial separation of the collar washer and the cup washer.

11. The cage-less thrust bearing of claim 10, wherein the cup washer defines a chamfer extending between the inner flange and the second sidewall, and the tab is disposed in a void space created by the chamfer.

12. The cage-less thrust bearing of claim 6, wherein the third and fourth race surfaces define opposing circular grooves, and each of the balls are partially disposed in each of the grooves.

13. A cage-less thrust bearing comprising:
    first and second washers concentrically arranged such that the washers cooperate to define a ball chamber having a first pair of opposing axially extending race surfaces and a second pair of opposing radially extending race surfaces, wherein the first washer defines at least one tab configured to engage with the second washer to prevent axial separation of the first and second washers; and
    a plurality of balls disposed in the ball chamber without being retained by a cage, each ball being configured to ride on each of the race surfaces.

14. The cage-less thrust bearing of claim 13, wherein the first washer includes inner and outer axially extending flanges and a radially extending sidewall that are arranged to form a C-shaped cross section, wherein the first pair of race surfaces are defined on the inner and outer flanges and one of the race surfaces of the second pair are defined on the sidewall.

15. The cage-less thrust bearing of claim 14, wherein the second washer includes a radially extending sidewall and an axially extending collar arranged to form an L-shaped cross section, wherein the other of the race surfaces of the second pair are defined on the sidewall of the second washer.

16. The cage-less thrust bearing of claim 15, wherein the inner flange is seated on the collar.

17. The cage-less thrust bearing of claim 13, wherein the second washer defines a chamfer, and the tab is disposed in a void space created by the chamfer.

* * * * *